(12) United States Patent
Tanaka (10) Patent No.: US 10,901,503 B2
(45) Date of Patent: Jan. 26, 2021

(54) AGENT APPARATUS, AGENT CONTROL METHOD, AND STORAGE MEDIUM

(71) Applicant: HONDA MOTOR CO., LTD., Tokyo (JP)

(72) Inventor: Ryosuke Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/578,505

(22) Filed: Sep. 23, 2019

(65) Prior Publication Data

US 2020/0103964 A1 Apr. 2, 2020

(30) Foreign Application Priority Data

Sep. 28, 2018 (JP) ................. 2018-185288

(51) Int. Cl.
*G06F 3/01* (2006.01)
*G06F 3/14* (2006.01)
*G10L 15/22* (2006.01)
*G06F 3/16* (2006.01)
*G01C 21/36* (2006.01)

(52) U.S. Cl.
CPC ............ *G06F 3/013* (2013.01); *G06F 3/1423* (2013.01); *G06F 3/16* (2013.01); *G10L 15/22* (2013.01); *G01C 21/3626* (2013.01); *G10L 2015/223* (2013.01)

(58) Field of Classification Search
None
See application file for complete search history.

(56) References Cited

U.S. PATENT DOCUMENTS

| 7,940,285 | B2* | 5/2011 | Would | G06F 3/0482 345/629 |
| 2012/0200490 | A1* | 8/2012 | Inada | G06F 3/013 345/156 |
| 2014/0309868 | A1* | 10/2014 | Ricci | G06K 9/00268 701/36 |
| 2014/0310610 | A1* | 10/2014 | Ricci | B60K 35/00 715/744 |
| 2016/0029111 | A1* | 1/2016 | Wacquant | H04R 27/00 381/71.4 |
| 2016/0267056 | A1* | 9/2016 | Hertzog | G06F 3/0482 |
| 2018/0089900 | A1* | 3/2018 | Rober | G06F 3/012 |
| 2019/0004514 | A1* | 1/2019 | Hiwatashi | G06K 9/00845 |

FOREIGN PATENT DOCUMENTS

JP 2018-103880 7/2018

* cited by examiner

*Primary Examiner* — Robert J Craddock
(74) *Attorney, Agent, or Firm* — Amin, Turocy & Watson, LLP (57) ABSTRACT

An agent apparatus includes: a microphone which collects audio in a vehicle cabin; a speaker which outputs audio to the vehicle cabin; a recognizer which recognizes the meaning of audio collected by the microphone; a display provided in the vehicle cabin; and an agent controller which causes the display to display an agent image in a form of speaking to an occupant and causes the speaker to output audio spoken by the agent image, wherein, when an image provided to the occupant is displayed on the display, the agent controller generates an agent image for guiding the line of sight of the occupant to a display position of the provided image.

9 Claims, 8 Drawing Sheets

| COMMAND | CONTROL DETAILS |
|---|---|
| TURN ON RADIO | APPLICATION CONTROL: EXECUTE RADIO APPLICATION |
| TURN ON HEATING | APPARATUS CONTROL: START AIR CONDITIONER |
| WHAT IS THE DISTANCE TO TOKYO STATION? | AUDIO CONTROL: *** [km] FROM HERE<br>DISPLAY CONTROL: DISPLAY ROUTE TO TOKYO STATION |
| HOW MANY RESTAURANT ARE NEAR HERE? | AUDIO CONTROL: THERE ARE *** RESTAURANTS NEAR HERE<br>DISPLAY CONTROL: DISPLAY RESTAURANTS IN LIST |
| ... | ... |

AGENT APPARATUS, AGENT CONTROL METHOD, AND STORAGE MEDIUM

CROSS-REFERENCE TO RELATED APPLICATION

Priority is claimed on Japanese Patent Application No. 2018-185288, filed Sep. 28, 2018, the content of which is incorporated herein by reference.

BACKGROUND

Field of the Invention

The present invention relates to an agent apparatus, an agent control method, and a storage medium.

Description of Related Art

Conventionally, a display system which includes a plurality of displays in a vehicle cabin and performs displaying of a map and a guidance, displaying of video content, or the like on a specific display from among the plurality of displays on the basis of an operation input such as setting of a navigation system, selecting or playing content such as videos, or the like is known (e.g., Japanese Unexamined Patent Application, First Publication No. 2018-103880)

SUMMARY

However, in the conventional technology, it is necessary to search for a display and a display position to which a display result based on an operation input of an occupant is output. Accordingly, the line of sight of a driver deviates from a monitoring area while the driver searches for a display position and thus driving may be disturbed as a result.

An object of aspects of the present invention devised in view of the aforementioned circumstances is to provide an agent apparatus, an agent control method, and a storage medium for allowing an occupant to easily ascertain a position at which an image will be displayed.

An agent apparatus, an agent control method, and a storage medium according to the present invention employ the following configurations.

(1): An agent apparatus according to one aspect of the present invention includes: a microphone which collects audio in a vehicle cabin; a speaker which outputs audio to the vehicle cabin; a recognizer which recognizes the meaning of audio collected by the microphone; a display provided in the vehicle cabin; and an agent controller which causes the display to display an agent image in a form of speaking to an occupant and causes the speaker to output audio spoken by the agent image, wherein, when an image provided to the occupant is displayed on the display, the agent controller generates an agent image for guiding the line of sight of the occupant to a display position of the provided image.

(2): In the aforementioned aspect of (1), the agent controller may move a display position of the agent image to the display position of the image provided to the occupant.

(3): In the aforementioned aspect of (2), the agent controller may locate a sound image such that an output destination of the audio spoken by the agent image is moved in accordance with movement of the display position of the agent image.

(4): In the aforementioned aspect of (1), the display may include a plurality of displays, and the agent controller may cause the agent image to guide the line of sight of the occupant from a first display to a second display among the plurality of displays.

(5): In the aforementioned aspect of (4), the first display may be provided at a position closer to a sight line direction of the occupant during vehicle driving than that of the second display.

(6): In the aforementioned aspect of (4), the second display may have a wider viewing angle than the first display.

(7): In the aforementioned aspect of (1), the agent apparatus may further include a sight line detector which detects the line of sight of the occupant, wherein the agent controller displays the agent image at a sight line position of the occupant detected by the sight line detector and then moves the agent image to the image provided to the occupant.

(8): In the aforementioned aspect of (1), the agent apparatus may further include a sight line detector which detects the line of sight of the occupant, wherein the agent controller performs guidance of the line of sight of the occupant according to the agent image when the provided image is not present at a sight line position of the occupant detected by the sight line detector.

(9): An agent control method according to another aspect of the present invention is an agent control method, using a computer of an agent apparatus, including: collecting audio in a vehicle cabin; recognizing the meaning of the collected audio; causing a display provided in the vehicle cabin to display an agent image in a form of speaking to an occupant and causing a speaker which outputs audio to the vehicle cabin to output audio spoken by the agent image; and, when an image provided to the occupant is displayed on the display, generating an agent image for guiding the line of sight of the occupant to a display position of the provided image.

(10): A storage medium according to another aspect of the present invention is a computer-readable non-transitory storage medium storing a program causing a computer of an agent apparatus to: collect audio in a vehicle cabin; recognize the meaning of the collected audio; cause a display provided in the vehicle cabin to display an agent image in a form of speaking to an occupant and cause a speaker which outputs audio to the vehicle cabin to output audio spoken by the agent image; and, when an image provided to the occupant is displayed on the display, generate an agent image for guiding the line of sight of the occupant to a display position of the provided image.

According to the aforementioned aspects of (1) to (10), it is possible to allow an occupant to easily ascertain a position at which an image is displayed.

DESCRIPTION OF EMBODIMENTS

Hereinafter, embodiments of an agent apparatus, an agent control method and a storage medium of the present invention will be described with reference to the drawings. An agent apparatus provided in a vehicle (hereinafter, a vehicle M) and having an interactive agent function will be described as an example of the agent apparatus in the following. For example, an interactive agent provides various types of information at the request of an occupant of the vehicle M or controls apparatuses in the vehicle while having a conversation with the occupant. The interactive agent is realized, for example, using a natural language function (a process of understanding the structure and meaning of text), a conversation control process, a search process and the like in addition to an audio recognition process of recognizing audio of an occupant (a process of converting audio into text) in an integrated manner. Some or all of these processes may be realized by artificial intelligence (AI) technology. Some or all of components for performing these processes may be provided in a server device or the like which can communicate with the vehicle M. The agent apparatus generates an image (hereinafter referred to as an agent image) of a personified agent that performs communication with an occupant in a vehicle and causes a display in the vehicle to display the generated agent image.

[Overall Configuration]

Figure 1:
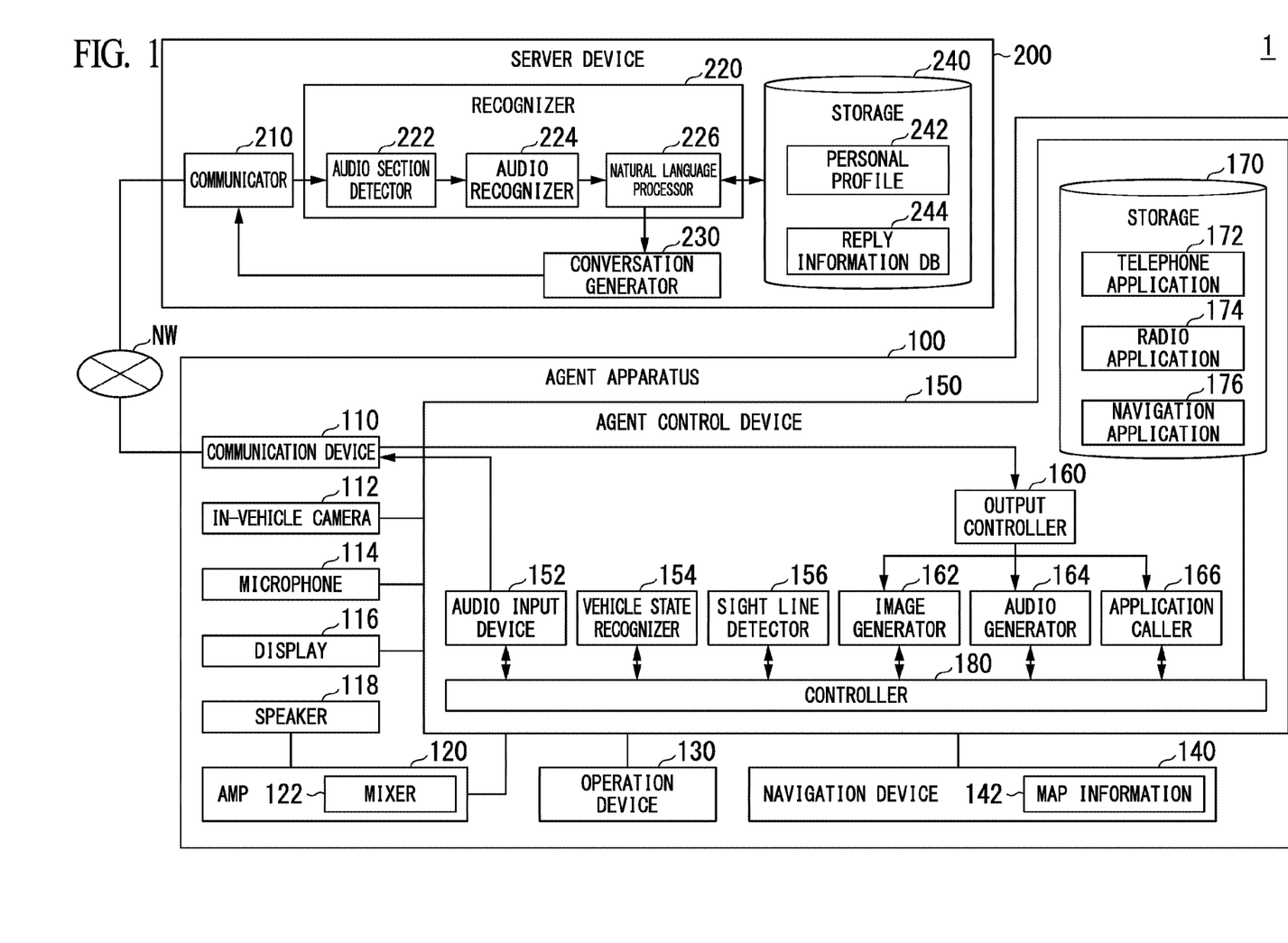
FIG. 1 is a block diagram of an agent system including an agent apparatus according to an embodiment.

FIG. 1 is a block diagram of an agent system 1 including an agent apparatus according to an embodiment. The agent system 1 includes, for example, one or both of an agent apparatus 100 and a server device 200. The agent apparatus 100 and the server device 200 are connected in a state in which data can be transmitted and received through a network NW such as the Internet, a wide area network (WAN) or a local area network (LAN), for example. Although the server device 200 can communicate with a plurality of agent apparatuses 100, it is assumed that the server device 200 communicates with one agent apparatus 100 in the following for convenience of description.

The agent apparatus 100 performs a conversation with an occupant of the vehicle M, performs a request for an inquiry according to audio or the like from the occupant to the server device 200 and presents, to the occupant, a reply to the request obtained from the server device 200 in a predetermined output mode. In the following description, although the occupant may be an occupant (hereinafter, a driver) who sits on a driver's seat, for example, the occupant may be an occupant (fellow passenger) who sits on a passenger seat or a back seat in addition to the occupant who sits on the driver's seat.

The agent apparatus 100 includes, for example, a communication device 110, an in-vehicle camera 112, a microphone 114, a display 116, a speaker 118, an amplifier (AMP) 120, an operation device 130, a navigation device 140, and an agent control device (an example of an agent controller) 150. These devices and equipment are connected through a multiplex communication line such as a controller area network (CAN) communication line, a serial communication line, a wireless communication network, or the like. The components shown in FIG. 1 are merely an example and some of the components may be omitted or other components may be further added.

The communication device 110 communicates with the server device 200, other vehicles and a terminal device carried by an occupant through the network NW, for example, using a cellular network, a Wi-Fi network, Bluetooth (registered trademark), dedicated short range communication (DSRC) or the like. For example, the communication device 110 may transmit, to the server device 200, audio input through an audio input device 152, vehicle state information recognized by a vehicle state recognizer 154, information about a line of sight of a driver detected by a sight line detector 156, and the like. The communication device 110 receives conversation information from the server device 200.

The in-vehicle camera 112 captures an image including the face of an occupant who sits on a seat provided in the vehicle cabin of the vehicle M, for example. For example, the in-vehicle camera 112 may be a digital camera using a solid state imaging device such as a charge coupled device (CCD) or a complementary metal oxide semiconductor (CMOS). The in-vehicle camera 112 captures an image of a driver at predetermined timings, for example. A captured image of the in-vehicle camera 112 is output to the agent control device 150.

The microphone 114 is an audio input device for collecting audio in the vehicle cabin. For example, the microphone 114 may be provided near a map lamp or on a steering wheel, an instrument panel or a seat. A plurality of microphones 114 may be provided in the vehicle cabin.

The display 116 is provided in a vicinity in front of an occupant sitting on a seat in the vehicle cabin. The speaker 118 is provided in the vicinity of a seat in the vehicle cabin or the display 116. A plurality of displays 116 and a plurality of speakers 118 may be provided in the vehicle cabin.

Figure 2:
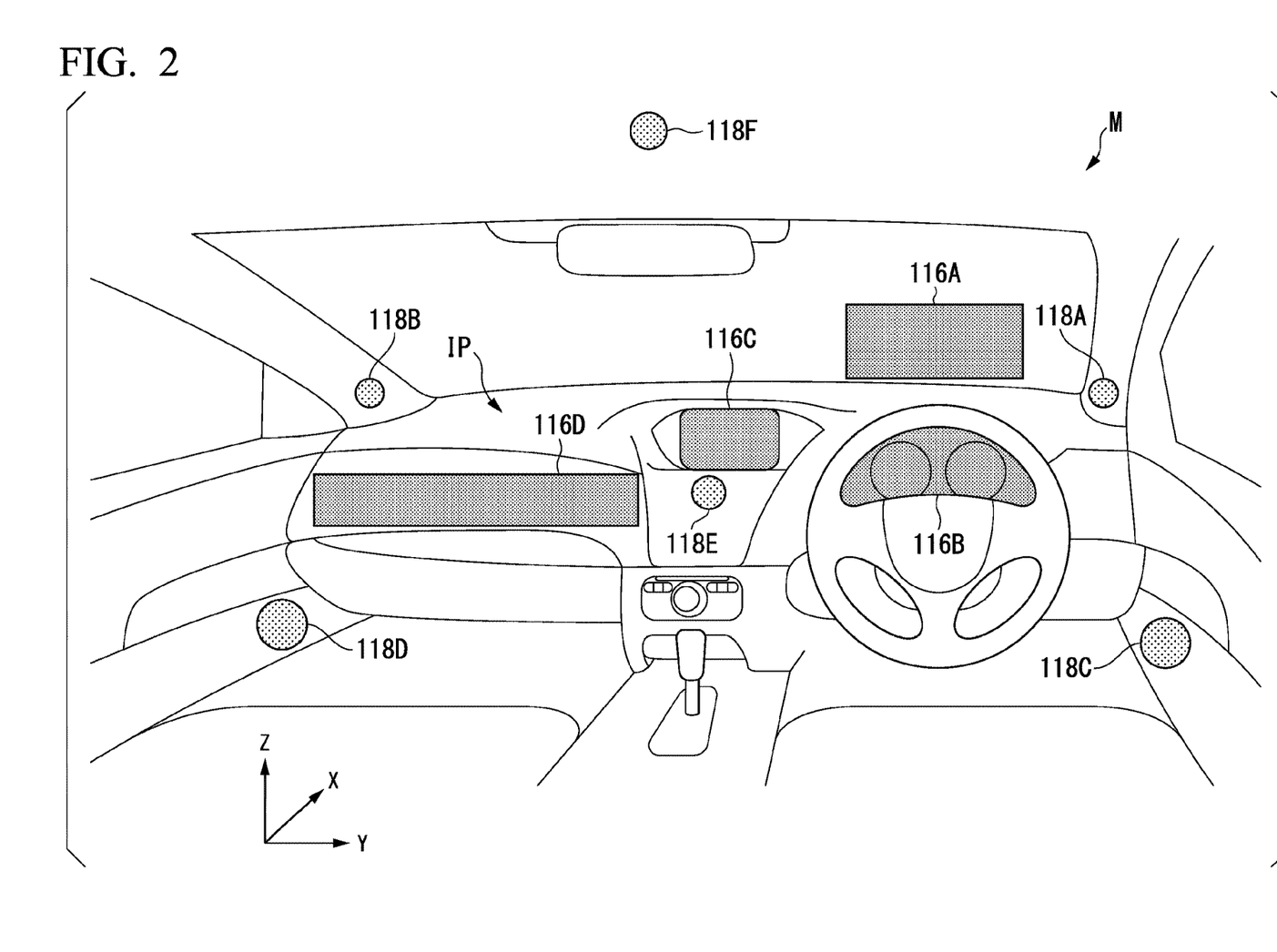
FIG. 2 is a diagram schematically showing displays and speakers provided in a vehicle.

FIG. 2 is a diagram schematically showing displays and speakers provided in the vehicle M. Displays 116A to 116D and speakers 118A to 118F are provided in the vehicle cabin of the vehicle M shown in FIG. 2. The display 116A is an example of a "first display." At least one of the displays 116B to 116D is an example of a "second display." The display 116A is a head-up display (HUD) device, for example. The HUD device is a device which causes an image to be overlaid on a landscape and visually recognized and, as an example, a device which allows a driver to visually recognize a virtual image by projecting light including an image to a front windshield or a combiner of the vehicle M.

The display 116A is provided at a position (more specifically, an outside monitoring area) closer to a direction of a line of sight of a driver when the driver drives the vehicle (for example, a monitoring area in a traveling direction of the vehicle M) than that of the displays 116B to 116D. The display 116A displays, for example, an image corresponding to navigation processing performed by the navigation device 140, images generated by the agent control device 150, and the like.

The display 116B is provided in a vicinity in front of the driver's seat (e.g., a seat closest to the steering wheel) in the instrument panel IP and disposed at a position at which it can be visually recognized by a driver through a hole in the steering wheel or over the steering wheel. The display 116B is a liquid crystal display (LCD), an organic electroluminescence (EL) display device, or the like, for example. The display 116B displays, for example, images of the speed, the engine RPM, the amount of remaining fuel, a radiator water temperature, the mileage and other information of the vehicle M, images generated by the agent control device 150, and the like.

The display 116C is provided in the vicinity of the center of the instrument panel IP. The display 116C is an LCD, an organic EL display device or the like, for example, like the display 116B. The display 116C displays, for example, an image corresponding to navigation processing performed by the navigation device 140, images generated by the agent control device 150, and the like. The display 116C may display a television program, play a DVD and display content such as a downloaded movie.

The display 116D is provided in a vicinity in front of the passenger seat (seat next to the driver's seat) in the instrument panel IP. The display 116D displays, for example, content images such as a television program and a movie downloaded from the server device 200, other images generated on the basis of execution of applications, images generated by the agent control device 150, and the like. A display (electronic mirror) which displays images of the sides and rear of the vehicle M acquired by a camera outside the vehicle may be provided in addition to the above-described displays in the vehicle cabin.

The displays 116B to 116D have wider viewing angles than the display 116A. Accordingly, when a reply result to an inquiry of a driver is displayed, the agent control device 150 can allow the driver to easily visually recognize the reply result by causing the displays 116B to 116D to display the reply result. The agent control device 150 can allow other fellow passengers as well as the driver to easily recognize the reply result by causing the display 116C or 116D to display the reply result.

The speakers 118A and 118B may be provided on left and right window pillars (so-called A pillars) at the front of the vehicle M, for example. The speaker 118C is provided on the lower part of the door on the side of the driver's seat and the speaker 118D is provided on the lower part of the door on the side of the passenger seat. The speaker 118E is provided in the vicinity of the display 116C, that is, near the center of the instrument panel IP. The speaker 118F is provided in the vicinity of the center portion of the ceiling of the vehicle cabin.

Figure 3:
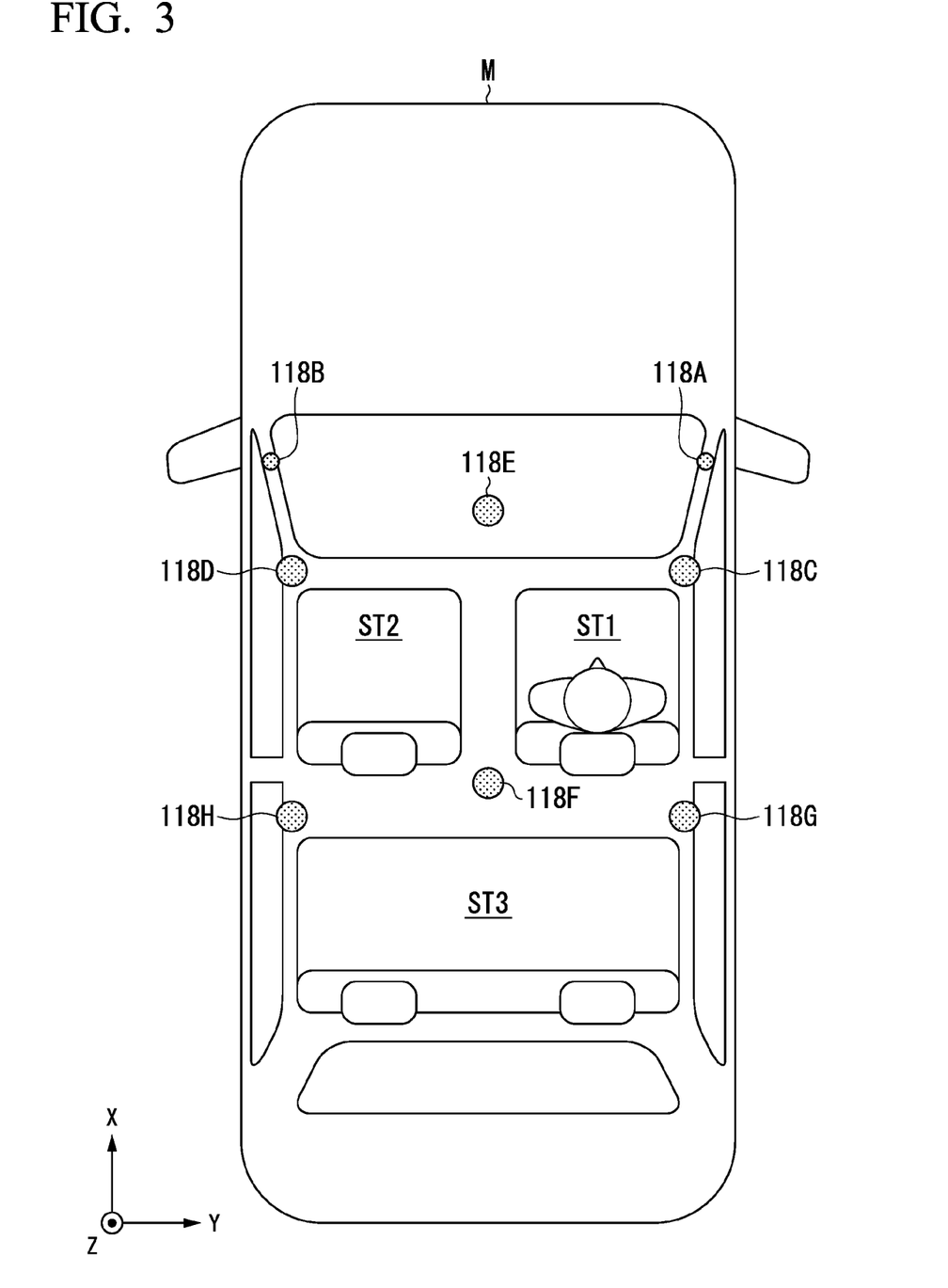
FIG. 3 is a diagram for explaining positions of speakers in the vicinity of a back seat.

A speaker may be provided in the vicinity of the back seat in the vehicle M. FIG. 3 is a diagram for describing a position of a speaker in the vicinity of the back seat. In the example of FIG. 3, speakers 118G and 118H are provided in the vicinity of the back seat ST3 disposed behind the driver's seat ST1 and the passenger seat ST2 in addition to the speakers 118A to 118F shown in FIG. 2. Specifically, the speakers 118G and 118H are provided on the lower parts of left and right doors. A speaker 118 may be provided on a window pillar (so-called a B pillar) disposed between the front door and the rear door of the vehicle M or provided behind the back seat.

The AMP 120 adjusts the magnitude of a sound output from the speaker 118 according to control of an audio generator 164. For example, the AMP 120 may allow sound adjustment between 0 to 100% with respect to a magnitude of a reference sound (maximum intensity). The AMP 120 includes, for example, a mixer 122. The mixer 122 has a function of combining a plurality of input sounds. When a plurality of speakers 118 are provided, the mixer 122 has a function of distributing sounds to be output to the respective speakers.

The operation device 130 receives a manual operation of an occupant. The operation device 130 includes a switch, a button, a key and the like, for example. The operation device 130 is provided, for example, on the steering wheel or the instrument panel. The operation device 130 may be integrated with the display 116 as a touch panel.

The navigation device 140 identifies the location of the vehicle M on the basis of, for example, signals received from global navigation satellite system (GNSS) satellites. The navigation device 140 determines a route (hereinafter a route on a map) from the identified location of the vehicle M (or an input arbitrary location) to a destination input by an occupant using the operation device 130 or the display 116 with reference to map information 142. For example, the map information 142 may be information representing road shapes according to links indicating roads and nodes connected through links. The map information 142 may include curvatures of roads, point of interest (POI) information and the like.

The navigation device 140 may perform route guidance according to map image display of the display 116 and audio output by a speaker on the basis of a route on a map. For example, the navigation device 140 may be realized by a function of a terminal device such as a smartphone or a tablet terminal of an occupant. The navigation device 140 may transmit a current location and a destination to the server device 200 or a navigation server through the communication device 110 and acquire a route equivalent to a route on a map from the server device 200 or the navigation server.

The above-described function of the navigation device 140 may be realized by a function of an application (navigation application 176) for navigation executed by the agent control device 150.

[Agent Control Device]

The agent control device 150 includes, for example, the audio input device 152, the vehicle state recognizer 154, the sight line detector 156, an output controller 160, an image generator 162, an audio generator 164, an application caller 166, a storage 170, and a controller 180. These components are realized, for example, by a computer processor such as a central processing unit (CPU) executing a program (software). Some or all of these components may be realized by hardware (circuit part including circuitry) such as a large scale integration (LSI) circuit, an application specific integrated circuit (ASIC), a field-programmable gate array (FPGA) or a graphics processing unit (GPU) or realized by software and hardware in cooperation. The program may be stored in the storage 170 in advance or stored in a separable storage medium (non-transitory storage medium) such as a DVD or a CD-ROM and installed in the storage 170 when the storage medium is inserted into a drive device.

The audio input device 152 receives an input of audio of an occupant collected by the microphone 114. The audio input device 152 transmits the received audio (audio stream) to the server device 200 through the communication device 110. The audio input device 152 may transmit, to the server device 200, vehicle state information (e.g., the location of the vehicle M) recognized by the vehicle state recognizer 154 in synchronization with a timing at which audio is transmitted to the server device 200. The audio input device 152 may analyze received audio, determine whether the audio includes a specific word, and when the specific word is included therein, transmit audio for a predetermined time or in an audio section to the server device 200 thereafter. The specific word may be a wake word for starting control such as information presentation performed by the agent apparatus 100, for example.

The vehicle state recognizer 154 recognizes a state of the vehicle on the basis of, for example, the location of the vehicle M identified by the navigation device 140, a speed, an acceleration, an angular velocity around a vertical axis, and a direction of the vehicle M acquired by vehicle sensors mounted in the vehicle, and the like. States of the vehicle M includes, for example, a state in which the vehicle M has stopped, a state in which the vehicle M is traveling, a state in which the vehicle M turns left or right or changes lanes, and the like.

The sight line detector 156 performs analysis processing on an image (hereinafter referred to as a camera image) captured by the in-vehicle camera 112 to detect a line of sight of a driver. For example, the sight line detector 156 may detect a positional relation between the head and the eyes of the driver, a combination of reference points and moving points in the eyes, and the like from a camera image using a technique such as template matching. For example, when the reference points are inner corners of the eyes, the moving points are irises. When the reference points are corneal reflection areas, the moving points are pupils. In addition, the sight line detector 156 derives a direction of the face on the basis of the positions of the eyes with respect to the head. The sight line detector 156 derives a direction of a line of sight on the basis of the positions of the moving points with respect to the reference points. The sight line detector 156 may detect a position at which the driver gazes and a visual field region in association with the detected direction of the line of sight. The visual field region is a region within a predetermined range having a gaze position as a center. The sight line detector 156 may infer a display that the driver is viewing from the direction of the line of sight. Hereinafter, each piece of information detected by the sight line detector 156 is referred to as a "sight light position."

The output controller 160 controls information to be provided to an occupant on the basis of information (e.g., conversation information) acquired by the server device 200, and the like. Conversation information may include, for example, one or both of audio information and image information to be provided to the occupant. Information to be provided to the occupant may include, for example, images to be displayed on a screen by the display 116, audio to be output through the speaker 118, a function executed by an application which realizes each function in the vehicle cabin, and the like.

For example, the output controller 160 may cause the image generator 162 to generate an agent image which makes a predetermined expression or action or cause the audio generator 164 to generate audio information corresponding to conversation information acquired by the server device 200 on the basis of the conversation information.

The image generator 162 generates an agent image which makes a conversation with an occupant and displays the generated agent image at a predetermined display position of the display 116 according to control of the output controller 160 or the controller 180. For example, the agent image is an image in a form of speaking to an occupant. The agent image includes, for example, a face image in which at least a viewer (occupant) recognizes an expression or a face orientation. For example, the agent image may be an image in which parts resembling eyes or a nose are represented in a facial region and an expression or a face orientation is recognized on the basis of positions of the parts in the facial region. The agent image may be perceived three-dimensionally and include a head image in a three-dimensional space such that a face orientation of an agent is recognized by a viewer or include an image of a body (body, arms and legs) such that motions or actions of the agent are recognized.

The image generator 162 converts an image to be provided to the occupant acquired by the server device 200 into a display form (e.g., an image size and an image format) for causing the display 116 to display the image, indicated by the output controller 160, and causes the display 116 to display the converted image.

The audio generator 164 generates audio spoken by the agent image in association with conversation information and causes the speaker 118 to output the generated audio. Here, the audio generator 164 generates audio for locating a sound image at a position corresponding to the display position of the agent image using a plurality of speakers 118. Locating a sound image is determining a spatial position of a sound source detected by an occupant by adjusting the magnitude of a sound delivered to the left and right ears of the occupant, for example. A sound image is determined, for example, on the basis of sound characteristics inherently possessed by a sound source, information on a vehicle cabin environment, and a head-related transfer function (HRTF). The audio generator 164 can locate a sound image at a predetermined position using this principle.

Figure 4:
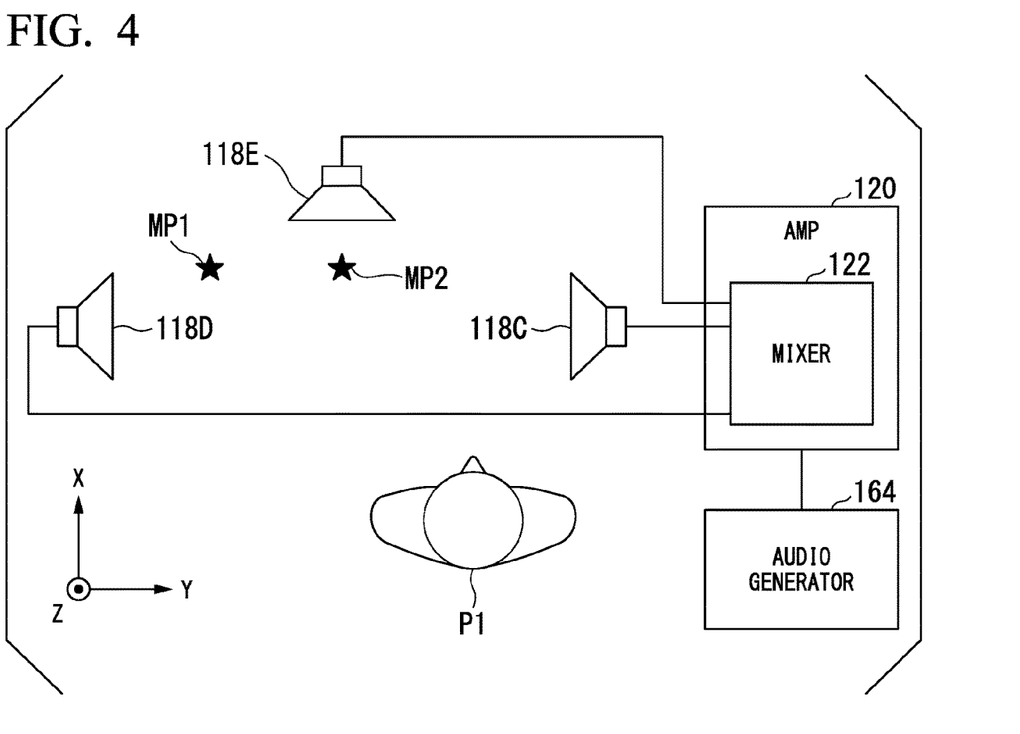
FIG. 4 is a diagram for explaining a state in which a position at which a sound image is located is moved.

FIG. 4 is a diagram for describing a state in which a position at which a sound image is located is moved. Although the above-described speakers 118C to 118E are used in FIG. 4 in order to simplify description, a position at which a sound image is located can be spatially moved using the speakers 118A to 118H provided in the vehicle cabin. For example, in a case in which a sound image is located at a spatial position MP1 determined through three-dimensional coordinates (X, Y, Z) shown in FIG. 4, when the AMP 120 performs an output of 5% of a maximum intensity from the speaker 118C, an output of 80% of the maximum intensity from the speaker 118D and an output of 15% of the maximum intensity from the speaker 118E for predetermined audio to be output on the basis of audio generated by the audio generator 164, an occupant P1 feels as if the sound image is located at the spatial position MP1 shown in FIG. 4 at the position of the occupant P1.

When the AMP 120 performs an output of 45% of the maximum intensity from the speaker 118C, an output of 45% of the maximum intensity from the speaker 118D and an output of 10% of the maximum intensity from the speaker 118E for the audio to be output, the occupant P1 can feel as if the sound image is located at a spatial position MP2 shown in FIG. 4 at the position of the occupant P1. In this manner, it is possible to change a position of sound image location by adjusting the plurality of speakers provided in the vehicle cabin and the magnitudes of sounds output from the respective speakers. Hereinafter, a position MP at which a sound image is located in a space is referred to as a "sound image position MP."

The application caller 166 calls an application corresponding to details of control performed by the output controller 160 from applications stored in the storage 170 and executes the called application in the controller 180 to realize the function of the application. Applications include, for example, a telephone application 172, a radio application 174, a navigation application 176, and the like. When the telephone application 172 is executed by the controller 180, communication with an external terminal having a calling function is performed through the communication device 110 and a function of calling to the other party is realized using the microphone 114 and the speaker 118. When the radio application 174 is executed by the controller 180, audio information transmitted from a radio station through a frequency designated by an occupant is acquired through the communication device 110 and a function of outputting the acquired audio information from the speaker 118 is realized. When the navigation application 176 is executed by the controller 180, functions such as route search and route guidance in cooperation with the navigation device 140 are realized.

The storage 170 is realized by, for example, an HDD, a flash memory, an electrically erasable programmable read only memory (EEPROM), a read only memory (ROM), a random access memory (RAM), or the like. The storage 170 stores, for example, programs read and executed by a processor, such as the telephone application 172, the radio application 174 and the navigation application 176, other pieces of information, and the like.

The controller 180 controls execution and suspension of each functional unit of the agent control device 150. For example, the controller 180 may receive a request from each functional unit through an application programming interface (API), select a functional unit which executes processing based on the received request and cause the selected functional unit to execute processing through the API. The controller 180 may realize processing of each functional unit of the agent control device 150 by executing an application (e.g., an agent application).

[Server Device]

The server device 200 includes a communicator 210, a recognizer 220, a conversation generator 230, and a storage 240, for example. These components are realized, for example, by a computer processor such as a CPU executing a program (software). Some or all of these components may be realized by hardware (circuit part including circuitry) such as an LSI circuit, an ASIC, a FPGA or a GPU or realized by software and hardware in cooperation. The program may be stored in advance in the storage 240 or stored in a separable storage medium (a non-transitory storage medium) such as a DVD or a CD-ROM and installed in the storage 240 when the storage medium is inserted into a drive device.

The communicator 210 communicates with the agent apparatus 100 through the network NW using a cellular network, Wi-Fi network, Bluetooth, DSRC or the like, for example. The communicator 210 receives an audio stream transmitted from the agent apparatus 100. The communicator 210 transmits conversation information such as audio or images generated by the conversation generator 230 to the agent apparatus 100.

The recognizer 220 recognizes the meaning of audio from an audio stream received through the communicator 210. The recognizer 220 includes, for example, an audio section detector 222, an audio recognizer 224 and a natural language processor 226. The audio section detector 222 detects an audio section from an audio stream transmitted from the agent apparatus 100. For example, the audio section detector 222 may detects an audio section on the basis of amplitudes and zero crossings of an audio waveform in the audio stream. The audio section detector 222 may perform section detection based on audio/non-audio identification in units of frame based on the Gaussian mixture model (GMM). The audio section detector 222 may perform audio section detection according to a process of matching with a database for detecting an audio section from characteristic information of an audio stream stored in advance in the storage 240 or the like.

The audio recognizer 224 recognizes audio in the audio section detected by the audio section detector 222 and converts the audio into text as text information. The audio recognizer 224 may identify characteristics of a speaker from the recognized audio. Characteristics of a speaker include, for example, a sex, an age, and information on whether the speaker is a driver or a fellow passenger.

The audio recognizer 224 may perform comparison with a personal profile 242 stored in the storage 240 using characteristic information acquired from audio. Personal information is associated with characteristic information of audio, for example, in the personal profile 242. Characteristic information of audio is, for example, information about characteristics of speaking such as a pitch, intonation, rhythm (tone pattern) and pause, and feature quantities according to Mel frequency cepstrum coefficients and the like. Characteristic information of audio is, for example, information acquired by causing an occupant to utter a predetermined word or sentence during initial registration of the occupant and analyzing the uttered voice. Personal information includes, for example, a name, an address, an age, a hobby, and a past history of use of the server device 200. A name, an address, an age and a hobby are set along with characteristic information of audio during initial registration of an occupant and then appropriately updated according to setting change and the like. The audio recognizer 224 compares characteristic information acquired from audio with characteristic information of the personal profile 242 stored in the storage 240 and recognizes personal information associated with matching characteristic information.

The natural language processor 226 performs natural language processing on text information converted into text by the audio recognizer 224 and recognizes the meaning of the text information. The natural language processing includes morpheme analysis, syntactic analysis, semantic analysis, context analysis, and the like. Morpheme analysis segments, for example, text information into minimum representation element units having meanings and analyzes a part of speech for each of the segmented units (morphemes), or the like.

Syntactic analysis analyzes a sentence construction, for example, on the basis of morphemes obtained through morpheme analysis.

Semantic analysis distinguishes unity having a meaning, for example, on the basis of a syntax obtained through syntactic analysis. Context analysis interprets a meaning in units of sentence or context, for example.

The natural language processor 226 generates a command corresponding to an interpreted meaning. For example, when meanings of "How many kilometers to Tokyo station?," "How long does it take to Tokyo station?" and the like have been interpreted as interpretation results, the natural language processor 226 generates a command replaced by standard text information "What is the distance to Tokyo station?". Accordingly, it is possible to easily acquire reply information even when request audio has text variation. The natural language processor 226 may recognize the meaning of text information using artificial intelligence processing such as machine learning processing using probability and generate a command based on an interpretation result, for example.

Figure 5:
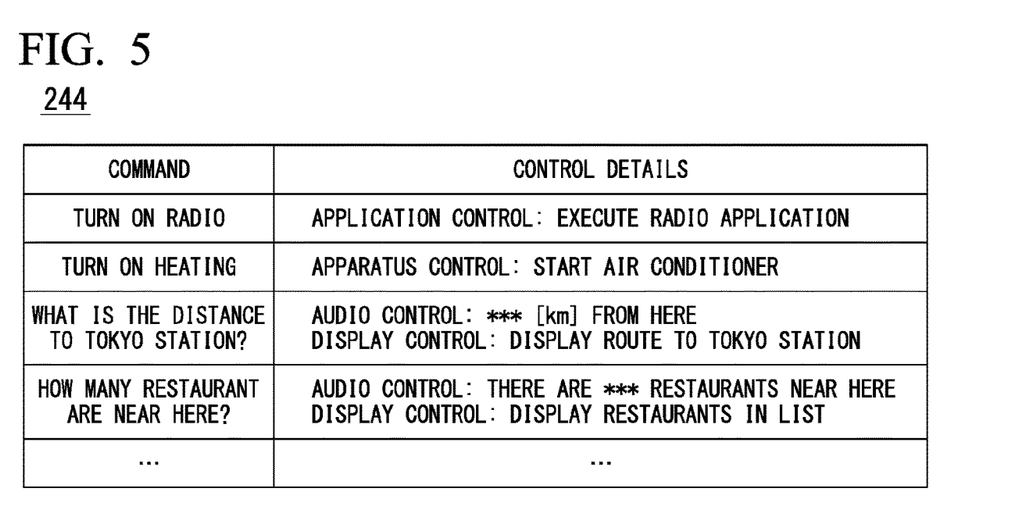
FIG. 5 is a diagram showing an example of details of a reply information DB.

The natural language processor 226 refers to commands of a reply information DB 244 stored in the storage 240 using the generated command and acquires control details corresponding to a matching command. FIG. 5 is a diagram showing an example of details of the reply information DB 244. For example, control details executed by the agent apparatus 100 may be associated with commands in the reply information DB 244. The control details include, for example, information such as execution or suspension of an application, start or stop of an apparatus, audio control, display control, and a sentence format for conversation.

The natural language processor 226 extracts control details associated with a matching command. For example, when a command is "Turn on the radio," control details for executing the radio application are extracted. When a distance to the Tokyo station is acquired, the natural language processor 226 may refer to map information (not shown) stored in the storage 240 or an external device on the basis of positional information of the vehicle M transmitted from the agent apparatus 100, derive a travel distance from the location of the vehicle to the Tokyo station and replace "*" of audio control for conversation "* [km] from here" by the derived travel distance to generate text information for audio output.

The conversation generator 230 generates conversation information for performing a conversation with an occupant on the basis of control details acquired by the natural language processor 226. For example, the conversation generator 230 may generate audio information (an audio stream) with respect to details (text information) acquired from the reply information DB 244 as conversation information. Audio information includes, for example, audio spoken by an agent image to an occupant. The conversation generator 230 may generate images, videos, text information and the like with respect to display control, generate control information (e.g., an application execution command) with respect to apparatus control and include the generated information in conversation information.

When personal information acquired from the personal profile 242 is present, the conversation generator 230 may call the name of an occupant using audio or generate audio information in a speaking manner resembling a speaking manner of the occupant on the basis of the personal information. The conversation generator 230 may acquire information about a hobby of an occupant acquired from a personal profile and include the acquired information in conversation information. The conversation generator 230 transmits generated conversation information to the agent apparatus 100 through the communicator 210.

In the above-described processing of the recognizer 220 and the conversation generator 230, first, the recognizer 220 may analyze input audio, determine whether the input audio includes a specific word such as a wake word and perform the above-described processing when the specific word is included.

The storage 240 is realized by, for example, an HDD, a flash memory, an EEPROM, a ROM, a RAM, or the like. The storage 240 stores the personal profile 242, the reply information DB 244, other pieces of information, and the like, or example.

[Agent Control Device]

Figure 6:
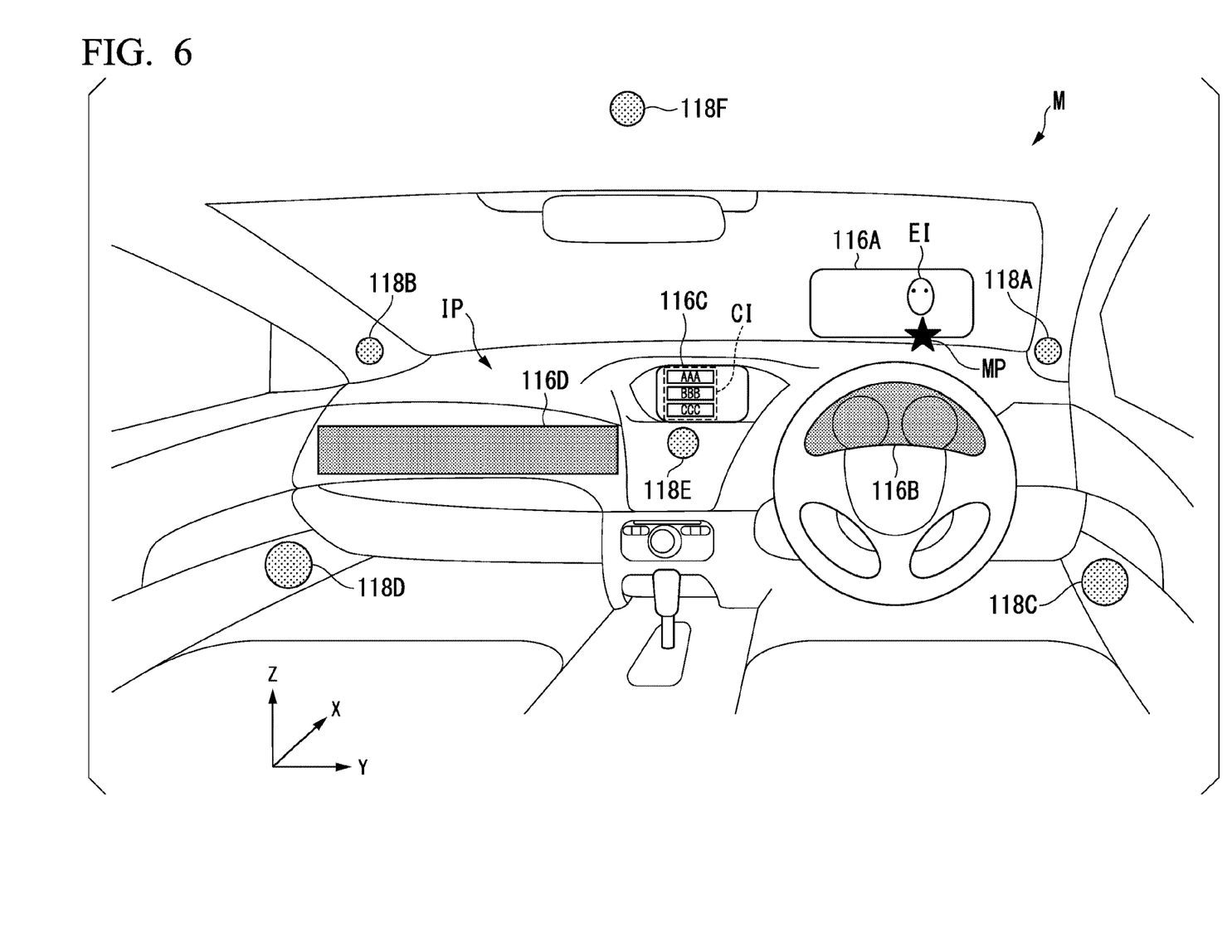
FIG. 6 is a diagram for explaining processing of an agent control device.

Hereinafter, the function of the agent control device 150 will be described in detail. FIG. 6 is a diagram for describing processing of the agent control device 150. When an agent image in a form of speaking to a driver is displayed while the driver drives the vehicle M, for example, the output controller 160 or the controller 180 of the agent control device 150 displays the agent image at a position at which the driver can visually recognize the agent image while monitoring the outside in the traveling direction of the vehicle M. In the example of FIG. 6, an agent image EI is displayed in a part of the display 116A.

Here, when the driver has spoken a request such as an inquiry to the agent, the content thereof is collected by the microphone 114 as audio and the collected audio is transmitted to the server device 200. In addition, when an image (hereinafter referred to as a reply image CI) included in conversation information is acquired from the server device 200, the output controller 160 outputs information for designating a display 116 and a display position (e.g., a coordinate position on a screen) at which the reply image CI will be displayed to the image generator 162 along with the reply image CI. The reply image CI is an example of an image provided to the driver.

The image generator 162 performs size conversion or format conversion for displaying the reply image CI on the designated display 116 and displays converted information on at least a part of the designated display 116. The output controller 160 outputs information about a display position of the agent image EI to the audio generator 164 along with audio information included in the conversation information. The audio generator 164 adjusts output intensity of audio from the speakers 118A to 118F and the like such that a sound image position MP is set at a three-dimensional position in the vicinity of the display position (e.g., within several [cm] from the display position) of the agent image EI indicated by the output controller 160 and outputs the audio information included in the conversation information.

Here, the driver monitors the traveling direction of the vehicle M during driving and thus cannot rapidly recognize a display and a position at which a reply result (reply image CI) has been presented. The driver averts their eyes from front monitoring while the driver searches for a reply result display position and thus driving may be disturbed. Accordingly, the output controller 160 moves the display position of the agent image EI such that the line of sight of the driver rapidly moves to a position at which the reply result is displayed in the present embodiment.

Figure 7:
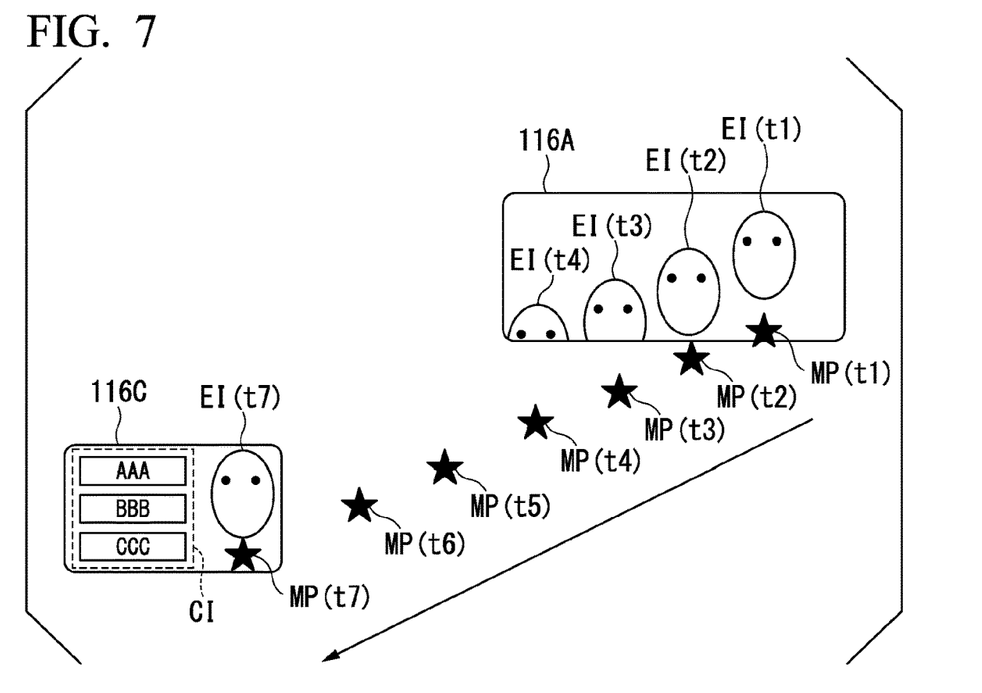
FIG. 7 is a diagram for explaining a state of movement of an agent image display position.

FIG. 7 is a diagram for describing a state of movement of the display position of the agent image EI. Hereinafter, it is assumed that times t1 to t7 have a relationship of "t1<t2<t3<t4<t5<t6<t7." EI(t*) represents a position of an agent image displayed at a time t* and MP(t*) represents a sound image position at the time t*.

For example, when the reply image CI has been displayed on the display 116C, the output controller 160 generates images through which the display position of the agent image EI is moved to the display 116C on which the reply image CI has been displayed through the image generator 162 and displays the generated image. In the example of FIG. 7, the image generator 162 generates agent images EI(t1) to EI(t4) displayed on the display 116A and an agent image EI(t7) displayed on the display 116C. The image generator 162 generates images as if the agent image EI disappears from the screen of the display 116A at the times t3 and t4. The image generator 162 may generate an animation image through which the agent image is moved to the agent images EI(t1) to EI(t4) at a predetermined time. The image generator 162 may generate an agent image in which an orientation of an agent faces the display position of the reply image CI and move the generated agent image. Accordingly, it is possible to cause the line of sight of the driver to follow the agent image EI to rapidly guide the line of sight of the driver to the reply image CI.

The output controller 160 may cause the audio generator 164 to locate a sound image such that an output destination of audio spoken by the agent image EI moves in accordance with movement of the agent image EI. In the example of FIG. 7, the audio generator 164 sets sound image positions MP at display positions of the agent images EI(t1) to EI(t4) and EI(t7) which move with the lapse of time and outputs audio. In this manner, it is possible to easily guide the light of sight of the driver to the position at which the reply image CI is displayed by moving a sound image position. It is possible to facilitate continuous guidance of the line of sight of the driver by continuing sound image location movement even in time periods in which the agent image EI cannot be displayed (e.g., the times t5 and t6 shown in FIG. 7).

The controller 180 performs control of the display position of the agent image EI and the sound image position on the basis of a sight line position of the driver detected by the sight line detector 156. The controller 180 may perform control of guidance of the line of sight of the driver according to movement of the agent image IM and the sound image position in cooperation with the output controller 160.

Figure 8:
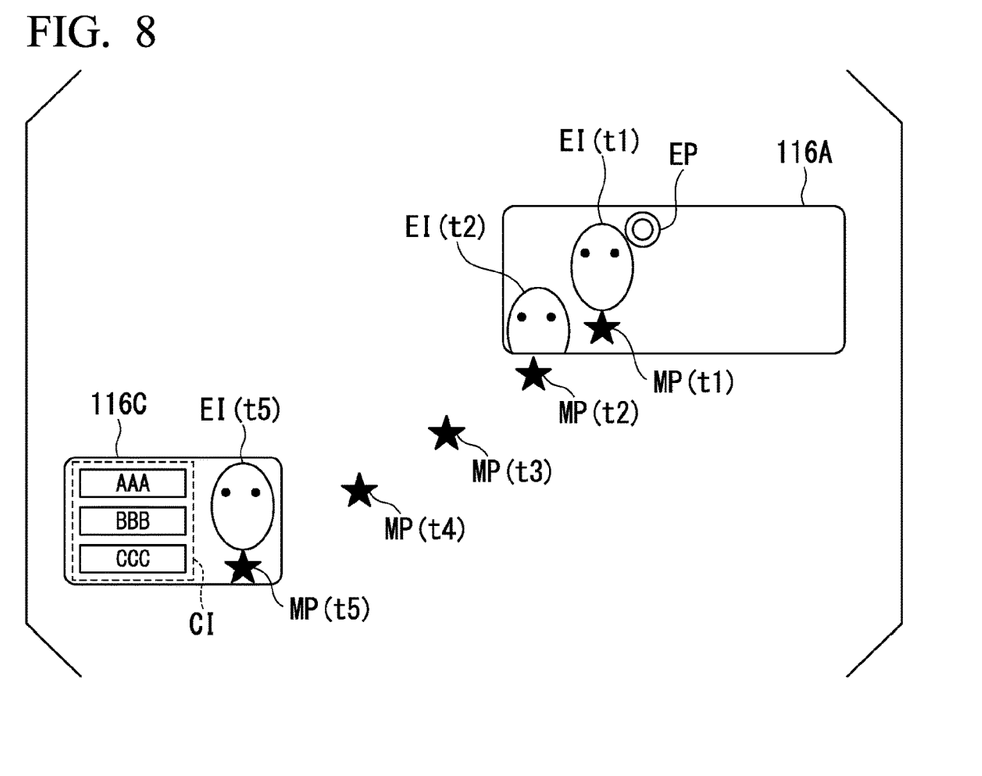
FIG. 8 is a diagram for explaining processing of a controller based on a sight line position.

FIG. 8 is a diagram for describing processing of the controller 180 based on a sight line position. When the agent image EI is generated through the image generator 162, for example, the controller 180 adjusts an agent image display position on the basis of a sight line position of the driver detected by the sight line detector 156. For example, when a sight line position EP of the driver is within the display 116A as shown, the controller 180 adjusts a position of an agent image EI displayed by the image generator 162 to a position associated with the sight line position EP of the driver. For example, the controller 180 may control the image generator 162 such that the agent image EI is displayed in the vicinity of the sight line position EP (e.g., within about 3 to 5 [cm] with the sight light position as a center). The controller 180 controls the audio generator 164 such that a sound image is located at a position associated with the agent image EI displayed in the vicinity of the sight line position EP.

The controller 180 determines whether the reply image CI is visually recognized on the basis of the sight line position EP of the occupant. For example, the controller 180 may determine that the reply image CI is not visually recognized when a distance between the sight line position EP and reply information is a predetermined distance or longer or a display present at the position corresponding to the sight line position EP differs from a display on which the reply image CI is displayed. When it is determined that the reply image CI is not visually recognized, the controller 180 performs control for moving the agent image EI and the sound image position MP in order to move the sight line position EP to the display position of the reply image CI. In this case, first, the controller 180 causes the image generator 162 to display an agent image EI(t1) in the vicinity of the sight line position EP of the occupant before the reply image CI is displayed and causes the audio generator 164 to locate audio output from the speaker 118 at a sound image position MP(t1). Then, the controller 180 moves the agent image EI and the sound image position MP to the display position of the reply image CI, displays an agent image EI(t5) in the vicinity of the reply image CI and locates audio at a sound image position MP(t5) at the time t5. Accordingly, guidance of the line of sight of the driver is performed on the basis of the current sight line position and thus the burden of movement of the line of sight of the driver can be reduced.

The controller 180 may continuously detect the sight line position EP of the driver even during movement of the agent image EI and the sound image position MP, and when the sight line position EP does not follow movement of the agent image EI and the sound image position MP, position the agent image EI and the sound image position MP at the sight line position EP again and perform control of guidance of the line of sight. Accordingly, it is possible to easily correctly position the line of sight of the driver at the display position of the reply information CI.

Figure 9:
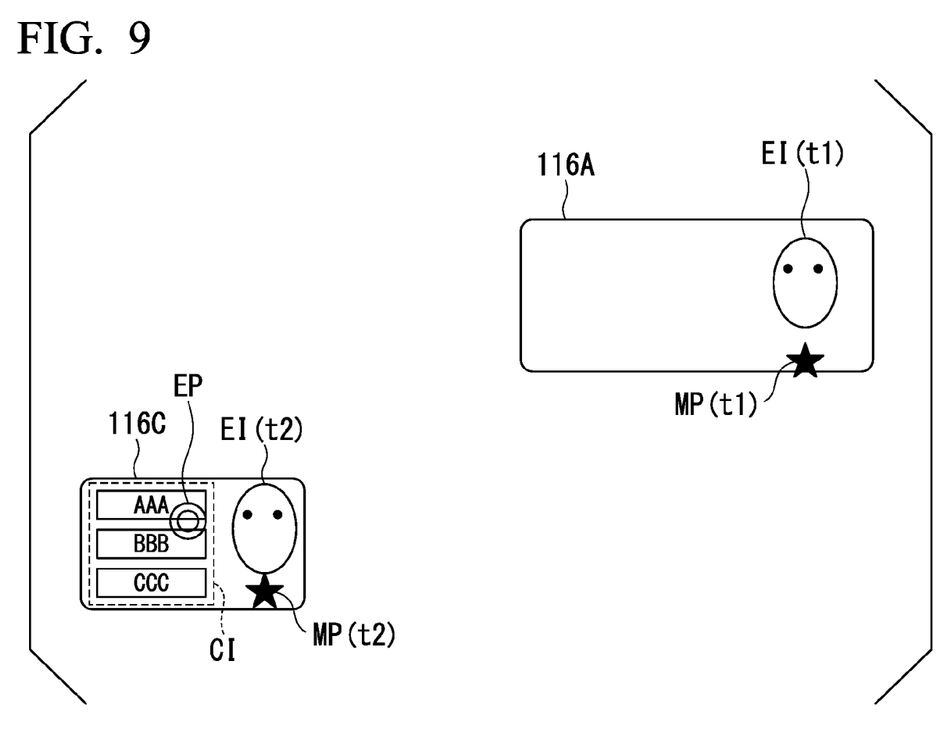
FIG. 9 is a diagram for explaining a situation in which a reply image is present near a sight line position.

The controller 180 does not perform control of guidance of the line of sight according to the agent image EI and the sound image position MP when the sight line position of the occupant is present near the reply image CI before guidance of the line of sight according to the agent image EI and the sound image position MP is performed. FIG. 9 is a diagram for describing a situation in which a reply image is present near a sight line position. When the sight line position EP is present near the reply image CI before control of guidance of the line of sight is performed, the controller 180 infers that the occupant can visually recognize the reply image CI and controls the image generator 162 such that the agent image EI(t1) switches to the agent image EI(t2) and the agent image EI(t2) is displayed. The controller 180 switches the sound image position MP(t1) to the sound image position MP(t2) in accordance with agent image switching and sets the sound image position MP(t2). In this manner, the controller 180 can appropriately control a display position of an agent image and a sound image position in accordance with the sight line position EP of the driver.

When display of the reply image CI ends, the controller 180 causes the display 116A to display the agent image EI and locates audio spoken by the agent image near the display position of the agent image EI. A case in which display of the reply image CI ends is a case in which a predetermined time has elapsed from display of the reply image CI or a case in which an operation of ending display has been performed by an occupant, for example.

The output controller 160 and the controller 180 may not perform adjustment of sound image location in accordance with the agent image with respect to audio (e.g., radio sound and program sound) other than audio spoken by the agent image.

[Processing Flow]

Figure 10:
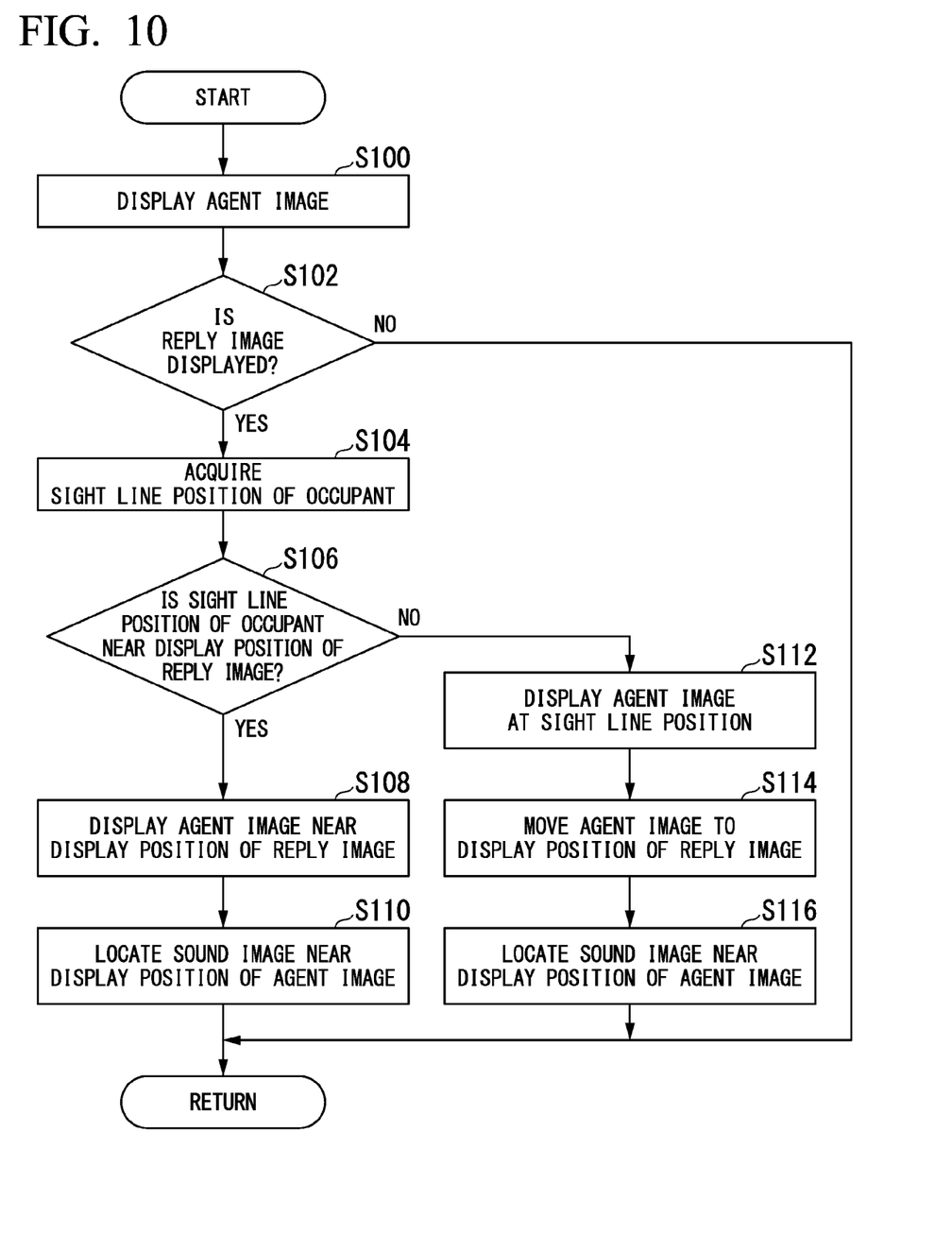
FIG. 10 is a flowchart showing an example of a flow of a series of processes performed by the agent device.

Hereinafter, a flow of a series of processes performed by the agent apparatus 100 will be described using a flowchart. FIG. 10 is a flowchart showing an example of a flow of a series of processes performed by the agent apparatus 100. In the processes in FIG. 10, a flow of processes when guidance of a light of sight of an occupant according to an agent image and sound image location is performed will be mainly described. The processes of this flowchart may be repeatedly performed in a predetermined period, for example.

First, the image generator 162 causes the display 116A to display an agent image (step S100). Then, the output controller 160 determines whether to display a reply image acquired from the server device 200 or the like in response to a request (inquiry) from an occupant (step S102). When it is determined that the reply image is displayed, the controller 180 acquires a sight line position of the occupant detected by the sight line detector 156 (step S104) and determines whether the sight line position of the occupant is in the vicinity of the display position of the reply image on the basis of the acquired sight line position (step S106). When it is determined that the sight line position of the occupant is in the vicinity of the display position of the reply image, the controller 180 causes the image generator 162 to display the agent image in the vicinity of the display position of the reply image (step S108). Then, the controller 180 causes the audio generator 164 to locate a sound image in the vicinity of the display position of the agent image (step S110).

When it is determined that the sight line position of the occupant is not in the vicinity of the display position of the reply image in the process of step S106, the controller 180 causes the image generator 162 to display the agent image at the sight line position of the occupant (step S112) and moves the agent image to the display position of the reply image (step S114). The controller 180 causes the audio generator 164 to locate the sound image in the vicinity of the display position of the agent image (step S116). Accordingly, processing of this flowchart ends. When the reply image is not displayed in the process of step S102, processing of this flowchart ends.

According to the above-described embodiment, it is possible to allow an occupant to easily ascertain a position at which an image is displayed. Specifically, according to the embodiment, it is possible to allow the occupant to intuitively ascertain a display position of a reply result when the reply result for an inquiry of the occupant, or the like is displayed on a display by moving an agent image and location of audio uttered by an agent to the display position at which the reply image is displayed. Accordingly, the occupant can immediately view the reply result in a case in which the occupant can afford to drive, and the like. Since the reply result has a low priority as compared to monitoring the surroundings of the vehicle M during driving by an occupant, it is possible to perform information provision which can minimize disturbing driving by promoting indirect guidance of a line of sight without a forced indication such as "Watch the display" using audio.

For example, some or all components of the server device 200 of the above-described embodiment may be provided in the agent apparatus 100. The agent apparatus according to the claims also includes a case of only including an on-board device and a case of a system including an on-board device and a server device. The agent apparatus 100 may acquire a reply to a request of an occupant in cooperation with other agent apparatuses and provide the acquired reply to the occupant.

While forms for embodying the present invention have been described using embodiments, the present invention is not limited to these embodiments and various modifications and substitutions can be made without departing from the spirit or scope of the present invention.

What is claimed is:

1. An agent apparatus comprising:
   a microphone which collects audio in a vehicle cabin;
   a speaker which outputs audio to the vehicle cabin;
   a recognizer which recognizes the meaning of audio collected by the microphone;
   a display provided in the vehicle cabin; and
   an agent controller which causes the display to display an agent image in a form of speaking to an occupant and causes the speaker to output audio spoken by the agent image,
   wherein, when an image provided to the occupant is displayed on the display, the agent controller generates an agent image and causes the display to display,
   wherein the agent controller moves a display position of the displayed agent image to the display position of the image provided to the occupant.

2. The agent apparatus according to claim 1, wherein the agent controller locates a sound image such that an output destination of the audio spoken by the agent image is moved in accordance with movement of the display position of the agent image.

3. The agent apparatus according to claim 1, wherein the display includes a plurality of displays, wherein the agent controller causes the agent image to guide the line of sight of the occupant from a first display to a second display among the plurality of displays.

4. The agent apparatus according to claim 3, wherein the first display is provided at a position closer to a sight line direction of the occupant during vehicle driving than that of the second display.

5. The agent apparatus according to claim 3, wherein the second display has a wider viewing angle than the first display.

6. The agent apparatus according to claim 1, further comprising a sight line detector which detects the line of sight of the occupant,
   wherein the agent controller displays the agent image at a sight line position of the occupant detected by the sight line detector and then moves the agent image to the image provided to the occupant.

7. The agent apparatus according to claim 1, further comprising a sight line detector which detects the line of sight of the occupant,
   wherein the agent controller performs guidance of the line of sight of the occupant according to the agent image when the provided image is not present at a sight line position of the occupant detected by the sight line detector.

8. An agent control method, using a computer of an agent apparatus, comprising:
   collecting audio in a vehicle cabin;
   recognizing the meaning of the collected audio;
   causing a display provided in the vehicle cabin to display an agent image in a form of speaking to an occupant and causing a speaker which outputs audio to the vehicle cabin to output audio spoken by the agent image;
   when an image provided to the occupant is displayed on the display, generating an agent image and causing the display to display; and
   moving a display position of the displayed agent image to the display position of the image provided to the occupant.

9. A computer-readable non-transitory storage medium storing a program causing a computer of an agent apparatus to:
   collect audio in a vehicle cabin;
   recognize the meaning of the collected audio;
   cause a display provided in the vehicle cabin to display an agent image in a form of speaking to an occupant and cause a speaker which outputs audio to the vehicle cabin to output audio spoken by the agent image;
   when an image provided to the occupant is displayed on the display, generate an agent image and cause the display to display; and
   move a display position of the displayed agent image to the display position of the image provided to the occupant.

* * * * *